12) United States Patent
Sedlak

(10) Patent No.: US 12,460,841 B2
(45) Date of Patent: Nov. 4, 2025

(54) GAS REFRIGERATING MACHINE, METHOD FOR OPERATING A GAS REFRIGERATING MACHINE AND METHOD FOR MANUFACTURING A GAS REFRIGERATING MACHINE HAVING A ROTATIONALLY SYMMETRICAL DESIGN

(71) Applicant: JustAirTech GmbH, Munich (DE)

(72) Inventor: Holger Sedlak, Sauerlach (DE)

(73) Assignee: JUSTAIRTECH GMBH, Munich (DE)

(*) Notice: Subject to any disclaimer, the term of this patent is extended or adjusted under 35 U.S.C. 154(b) by 204 days.

(21) Appl. No.: 18/306,594

(22) Filed: Apr. 25, 2023

(65) Prior Publication Data

US 2023/0258372 A1   Aug. 17, 2023

Related U.S. Application Data

(63) Continuation of application No. PCT/EP2021/079704, filed on Oct. 26, 2021.

(30) Foreign Application Priority Data

Oct. 28, 2020 (DE) ............ 10 2020 213 550.9

(51) Int. Cl.
F25B 9/00 (2006.01)
F25B 9/06 (2006.01)

(52) U.S. Cl.
CPC ............ F25B 9/004 (2013.01); F25B 9/06 (2013.01)

(58) Field of Classification Search
CPC ........ F25B 9/006; F25B 31/002; C09K 5/045; C09K 2205/122; C09K 2205/126
See application file for complete search history.

(56) References Cited

U.S. PATENT DOCUMENTS

| 4,730,464 A | 3/1988 | Lotz |
| 5,483,806 A | 1/1996 | Miller et al. |
| 5,497,615 A | 3/1996 | Noe et al. |
| 6,381,969 B1 | 5/2002 | Afeiche et al. |

(Continued)

FOREIGN PATENT DOCUMENTS

| CN | 204535480 U | * | 8/2015 |
| CN | 108885055 A | | 11/2018 |

(Continued)

OTHER PUBLICATIONS

Asakura et al. (JPH11159898A) English Translation (Year: 1999).*

(Continued)

Primary Examiner — Elizabeth J Martin
Assistant Examiner — Keona Lauren Banks
(74) Attorney, Agent, or Firm — McClure, Qualey & Rodack, LLP

(57) ABSTRACT

A gas refrigerating machine having: an input for gas to be cooled; a recuperator; a compressor having a compressor input, the compressor input being coupled to a first recuperator output; a heat exchanger; a turbine; and a gas output, wherein the recuperator is rotationally symmetrical, wherein an axis of symmetry of the recuperator coincides with an axis of the compressor, or an axis of the turbine, or an axis of a rotor of a drive motor, or an axis of the gas output, or an axis of the input, or an axis of a suction region basically or within manufacturing tolerances.

25 Claims, 11 Drawing Sheets

(56) References Cited

U.S. PATENT DOCUMENTS

| | | | |
|---|---|---|---|
| 2001/0035026 A1 | | 11/2001 | Bonaquist et al. |
| 2002/0073688 A1 | * | 6/2002 | Bosley .................. F28D 9/0018 29/890.03 |
| 2003/0131608 A1 | | 7/2003 | Rouse et al. |
| 2006/0059936 A1 | | 3/2006 | Radke et al. |
| 2008/0163644 A1 | | 7/2008 | Kadle et al. |
| 2013/0000328 A1 | * | 1/2013 | Levy ....................... F25B 9/004 62/402 |
| 2013/0294890 A1 | | 11/2013 | Cepeda-Rizo et al. |
| 2017/0045272 A1 | | 2/2017 | Bandhauer et al. |

FOREIGN PATENT DOCUMENTS

| | | | | |
|---|---|---|---|---|
| CN | 108981160 A | * | 12/2018 | ............... F24H 4/02 |
| DE | 35 44 445 A1 | | 6/1987 | |
| DE | 695 10 728 T2 | | 11/1999 | |
| DE | 695 27 283 T2 | | 1/2003 | |
| DE | 600 16 627 T2 | | 12/2005 | |
| EP | 2 492 472 A1 | | 8/2012 | |
| EP | 2 602 572 A1 | | 6/2013 | |
| JP | H11159898 A | * | 6/1999 | |
| JP | 2008014532 A | * | 1/2008 | |

OTHER PUBLICATIONS

Du et al. (CN108981160A) English Translation (Year: 2018).*
Hakamada et al. (JP2008014532A) English Translation (Year: 2008).*
Shen et al. (CN204535480U) English Translation (Year: 2015).*
International Search Report and Written Opinion issued in application No. PCT/EP2021/079704.
Zagarola, M., et al.; "High-capacity turbo-Brayton cryocoolers for space applications;" Cryogenics, vol. 46; No. 2-3; 2006; pp. 169-175; https://www.sciencedirect.com/science/article/pii/S0011227505001694/pdfft?md5=91b5da3ed7fb1d5116c4cd8a55c7951f&pid=1-s2.0-S0011227505001694-main.pdf.
Ebinger, I.; "Hochschule für Angewandte Wissenschaften Hamburg: Das Kältemittel Luft—Historie-Gegenwart—Zukunft;" Historikertagung HKK Historische Kälte- und Klimatechnik e.V.; Jun. 2013; pp. 1-28 https://www.vhkk.org/page/vortrag/pdf/Das_Kaeltemittel_Luft.pdf; pp. 1-28.
English language translation of "Hochschule für Angewandte Wissenschaften Hamburg: Das Kältemittel Luft."
Spence, S., et al.l; "Design, construction and testing of an air-cycle refrigeration system for road transport;" International journal of refrigeration; vol. 27; 2004; pp. 503-510.

* cited by examiner

GAS REFRIGERATING MACHINE, METHOD FOR OPERATING A GAS REFRIGERATING MACHINE AND METHOD FOR MANUFACTURING A GAS REFRIGERATING MACHINE HAVING A ROTATIONALLY SYMMETRICAL DESIGN

CROSS-REFERENCE TO RELATED APPLICATIONS

This application is a continuation of copending International Application No. PCT/EP2021/079704, filed Oct. 26, 2021, which is incorporated herein by reference in its entirety, and additionally claims priority from German Application No. 10 2020 213 550.9, filed Oct. 28, 2020, which is also incorporated herein by reference in its entirety.

TECHNICAL FIELD

The present invention relates to machines for heating and cooling and, in particular, to cold air refrigerating machines or gas refrigerating machines.

BACKGROUND OF THE INVENTION

Cold air refrigerating machines are well known and are used, for example, in space applications. In the technical publication "High-capacity turbo-Brayton cryocoolers for space applications", M. Zagarola et al, Cryogenics 46 (2006), pages 169 to 175, a cryocooler is disclosed, which is schematically shown in FIG. 5. A compressor C compresses gas circulating in the closed system. The compressed gas is cooled by a heat exchanger, which is schematically labeled "heat sink" and "heat release". The cooled gas is fed into a recuperator R, which feeds the thereby cooled gas to a turbine E. Cold gas is discharged from the turbine E, which absorbs heat via a heat exchanger or achieves a cooling effect. The gas leaving the heat exchanger providing the cooling effect, which is again warmer than the gas at the inlet thereof, is also fed into the recuperator R to be reheated.

The temperature-entropy diagram of the cycle in FIG. 5 is shown in FIG. 6. Isentropic compression is performed by the compressor C, as is shown by the transition from transition point 1 to transition point 2. Isobaric heat dissipation takes place through the heat exchanger for heat release, as shown by the transition from point 2 to point 3 in FIG. 6. Isobaric heat dissipation also takes place through the recuperator R, as shown by the transition between point 3 and point 4. Then, isentropic expansion takes place in the turbine E, as shown by the transition between point 4 and point 5. The cooling effect of the heat exchanger in turn represents an isobaric heat absorption, as represented by the transition from point 5 to point 6. The heat released in the heat exchanger is represented in the temperature-entropy diagram as the temperature difference between point 2 and point 3. Correspondingly, the temperature reduction achieved by the turbine expansion is represented by the temperature difference between point 4 and point 5. Finally, the temperature difference that can be used for cooling, represented as "available cooling", is shown between point 5 and point 6.

Other cold air refrigerating machines in various other implementations are presented in the lecture "Luft als Kältemittel—Geschichte der Kaltluftkältemaschine" (Air as a Refrigerant—History of the Cold Air Refrigerating Machines) by I. Ebinger, held at the Historikertagung (Historian convention) 2013 in Friedrichshafen on Jun. 21, 2013.

Compared to heat pumps used for cooling and heating, gas refrigerating machines have the advantage that energy-intensive circulation of liquid refrigerants can be avoided. In addition, gas refrigerating machines do not require continuous evaporation on the one hand and continuous condensation on the other. In the cycle shown in FIG. 5, only gas circulates without any transitions between the different aggregate states. Furthermore, very low pressures close to vacuum are required for heat pumps, especially if refrigerants that are problematic for the climate are to be dispensed with, and these pressures can lead to considerable expense in terms of generation, handling and maintenance during operation, especially in terms of equipment. Nevertheless, the use of cold air refrigerating machines is limited.

SUMMARY

According to an embodiment, a gas refrigerating machine may have: an input for gas to be cooled; a recuperator; a compressor having a compressor input, the compressor input being coupled to a first recuperator output; a heat exchanger; a turbine; and a gas output, wherein the recuperator is rotationally symmetrical, wherein an axis of symmetry of the recuperator coincides with an axis of the compressor, or an axis of the turbine, or an axis of a rotor of a drive motor, or an axis of the gas output, or an axis of the input, or an axis of a suction region of the recuperator basically or within manufacturing tolerances.

According to another embodiment, a method for operating a gas refrigerating machine having: an input for gas to be cooled; a recuperator; a compressor having a compressor input, the compressor input coupled to a first recuperator output; a heat exchanger coupled to a compressor output; and a turbine, the recuperator being rotationally symmetrical, may have the step of: operating the gas refrigerating machine such that an axis of symmetry of the recuperator coincides with an axis of the compressor, or an axis of the turbine, or an axis of a rotor of a drive motor, or an axis of the gas output, or an axis of the input, or an axis of a suction region of the recuperator basically or within manufacturing tolerances.

According to another embodiment, a method for manufacturing a gas refrigerating machine having: an input for gas to be cooled; a recuperator; a compressor having a compressor input, the compressor input coupled to a first recuperator output; a heat exchanger coupled to a compressor output; and a turbine, the recuperator being rotationally symmetrical, may have the step of: arranging the gas refrigerating machine such that an axis of symmetry of the recuperator coincides with an axis of the compressor, or an axis of the turbine, or an axis of a rotor of a drive motor, or an axis of the gas output, or an axis of the input, or an axis of a suction region of the recuperator basically or within manufacturing tolerances.

One aspect of the present invention is based on the finding that the gas refrigerating machine be designed in a particularly compact manner in order to prevent losses through pipes, in particular in the recuperator or in the connection between the recuperator and the compressor. For this purpose, the recuperator is arranged to extend around a suction region of the compressor, the suction region being separated from the recuperator by an intake wall. This integrated arrangement between the compressor with the suction region on the one hand and the recuperator on the other hand leads to the fact that a compact setup with optimum flow conditions can be achieved in order to suck in gas present in the primary side of the recuperator, through the recuperator. In addition, the effect of the recuperator is important for the efficiency of the entire gas refrigerating machine, which is why the recuperator is arranged to extend at least partially, and advantageously completely, around the suction region. This ensures that a substantial amount of gas is sucked from the recuperator from all sides over the entire suction region, which extends away from the compressor input, and is separated from the recuperator by the intake wall. Thus, although the recuperator may occupy a considerable volume, a compact design is still achieved because the compressor is integrated directly with the recuperator. On the other hand, this implementation also ensures that sufficient space remains for the secondary side in the recuperator, which thermally interacts with the primary side in the recuperator, to allow the flows of the warm gas flowing on the primary side and the flows of the warmer gas flowing on the secondary side to thermally interact well.

In advantageous embodiments, a direct flow or counter-flow principle is used in the recuperator to achieve a particularly good efficiency at this component. In further advantageous embodiments of the present invention, the first input of the recuperator into the primary side thereof represents a gas or air input, so that the gas refrigerating machine is operable in an open system. Then the turbine output or the gas outlet are also directed into a space, for example, into which the cooled air or, more generally, the cooled gas is introduced. Alternatively, the gas input on the one hand and the gas output on the other hand may be connected via a piping system and a heat exchanger to a system to be cooled. Then, the gas refrigerating machine according to the present invention is a closed system.

Advantageously, the entire gas refrigerating machine is installed in a housing which is typically rotationally symmetrical at least in its "interior" with an upright shape and a greater height than diameter, i.e. as a slender upright shape. This housing contains the gas input as well as the gas output and the recuperator, the compressor and the turbine and advantageously also the heat exchanger.

Advantageously, in operation, the compressor is arranged above the turbine. Again advantageously, the compressor comprises a radial wheel and the turbine also comprises a turbine wheel, the compressor wheel and the turbine wheel being arranged on a common axis, which axis further comprises a rotor of a drive motor interacting with a stator of the drive motor. Advantageously, the rotor is arranged between the compressor wheel and the turbine wheel.

In yet other embodiments, the recuperator is arranged in an outer region of the volume of the gas engine and the compressor input is arranged in an inner region of the volume of the gas engine, wherein the suction region is also located in the inner region of the volume. Advantageously, the suction region has an opening area that increases continuously from a first end to the second end so that the intake wall is formed continuously, i.e. advantageously without any edges. The end with the smaller opening area is connected to the compressor input and the end with the larger opening area is closed off so that the compressor operation creates a suction effect in the suction region which extends via the primary output of the recuperator, which is fluidically coupled to the suction region, through the recuperator to the primary input of the recuperator, which is either formed directly as a gas inlet or is connected to a gas outlet in the housing.

Again advantageously, a guide chamber of the compressor is arranged to guide the compressed gas from the center of the volume of the gas engine to the outside, where it is fed directly into a primary input of the heat exchanger. Through the heat exchanger, the heated gas flows from the outside to the inside and from there enters the secondary input or second input of the recuperator, which is advantageously located inside the volume and extends around the suction region and in particular around the intake wall, but is fluidically separated from the suction region. The gas fed into the secondary input flows from the inside to the outside in the secondary side of the recuperator, thus allowing a counter-flow principle which is particularly favorable thermally, and then flows from the outside with respect to the recuperator, advantageously into the suction region of the turbine, the gas flowing from the outside to the inside to relax through the turbine wheel into the air output, which is formed as a large surface advantageously in the lower part of the gas refrigerating machine. On the other hand, the gas input is formed in the lateral upper region of the gas refrigerating machine, by a plurality of perforations connected to corresponding gas channels, which form the gas inlet or primary inlet into the recuperator.

Advantageously, electronics used to control and operate the gas refrigerating machine are located in a region below the turbine suction region, i.e., adjacent to the air outlet, so that the cooled air can provide a cooling effect on electronic elements via the turbine output wall.

Furthermore, the setup of a cold air refrigerating machine is technically less complex and thus less prone to errors when compared to a heat pump, for example. In addition, a higher efficiency can be expected since no work has to be provided to move a considerable amount of liquid refrigerant in the circuit.

One aspect of the present invention relates to the arrangement of the recuperator at least partially around the suction region.

Another aspect of the present invention relates to the arrangement of the recuperator, the compressor, the heat exchanger, and the turbine in a single housing which may be cylindrical in shape, for example, having an elongated shape with a height greater than the diameter.

Another aspect of the present invention relates to the special implementation in which the compressor is located above the turbine to achieve an optimum flow effect of the gas in the gas refrigerating machine.

Another aspect of the present invention relates to placing the compressor wheel and the turbine wheel on an axis on which the rotor of the engine is also located, in order to create an optimal and efficient transmission of power from the turbine to the compressor in order to save drive energy to be supplied as much as possible.

Another aspect of the present invention relates to the implementation of a rotationally symmetrical recuperator with the compressor and the turbine, whose axis of rotation coincides with the axis of the recuperator, whether to achieve efficient flow guidance in the gas refrigerating machine.

Another aspect of the present invention relates to the advantageous arrangement and design of the heat exchanger in the gas refrigerating machine to achieve a space-saving gas refrigerating machine with efficient conversion of thermal energy.

Another aspect of the present invention relates to placing an electronics module in a cool region of the gas refrigerating machine, for example between the compressor wheel and the turbine wheel or in thermal interaction with the boundary of the turbine input on the path of the gas from the recuperator output into the turbine or near the particularly cool turbine output.

It should be particularly noted that each of the aspects can be implemented on its own, or together with one or more other or all of the other aspects mentioned.

BRIEF DESCRIPTION OF THE DRAWINGS

Embodiments of the present invention will be explained in detail below referring to the appended drawings, in which:

FIG. 7b is a side view of the advantageous compressor-turbine combination of FIG. 7a.

DETAILED DESCRIPTION OF THE INVENTION

Figure 1:
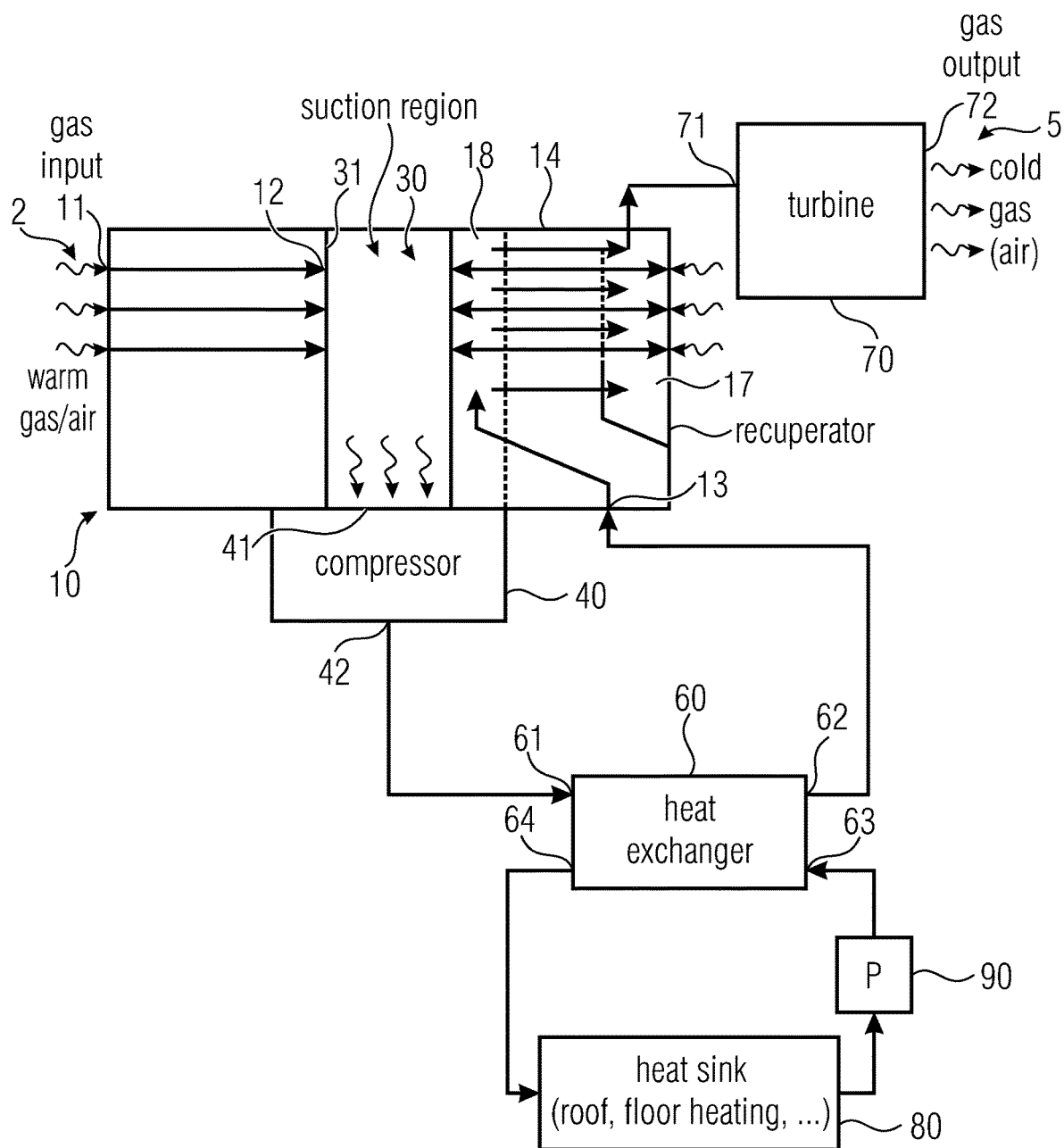
FIG. 1 is a schematic diagram of a gas refrigerating machine according to an embodiment of the present invention.

FIG. 1 shows a gas refrigerating machine with a gas input 2 for gas to be cooled, i.e. "warm" gas, and a gas output 5 for cooled, i.e. "cold" gas. In advantageous embodiments of the present invention, the gas is normal air, such as room air in an office, a data center, a factory, etc. In such a case, the gas refrigerating machine can be operated as an open loop by sucking air into a room via the gas input 2 at one point and discharging air that has been cooled into the room at another point in the room.

However, the present invention can also be implemented as a closed system in which the gas output 5 is connected to a primary side of a heat exchanger and the gas input 2 is also connected to the primary side of the heat exchanger, but to the "warm" end, and the secondary side of this heat exchanger is connected to a heat source.

The gas refrigerating machine further comprises a recuperator 10 having a first recuperator input 11, a first recuperator output 12, a second recuperator input 13, and a second recuperator output 14. The path from the first recuperator input 11 to the first recuperator output 12 represents the primary side of the recuperator, and the path from the second recuperator input 13 to the second recuperator output 14 represents the secondary side of the recuperator.

Furthermore, a compressor 40 is provided with a compressor input 41 and a compressor output 42. The compressor input 41 is coupled to the first recuperator output 12 via a suction region 30, which is bounded by the intake wall 31. In addition, a heat exchanger 60 is provided with a heat exchanger input 61 and a heat exchanger output 62. The first heat exchanger input 61 and the first heat exchanger output 62 form the primary side of the heat exchanger 60. The second heat exchanger input 63 and the second heat exchanger output 64 form the secondary side of the heat exchanger 60. The secondary side is coupled to a heat sink 80, which may be arranged, for example, on a roof if the gas refrigerating machine is used for cooling, or which may be a floor heating system if the gas refrigerating machine is used for heating, wherein a pump 90 is further provided in the secondary side, which is advantageously arranged between the heat sink 80 and the second heat exchanger input 63. As is shown in FIG. 1, the first heat exchanger input 61 is connected to the compressor output 42, and the first heat exchanger output 62 is connected to the second recuperator input 13, i.e. the secondary side of the recuperator. Furthermore, a turbine 70 is provided, which has a turbine input 71 and a turbine output 72. The turbine input 71 is advantageously connected to the second output 14 of the recuperator 10, i.e. to the output of the secondary side of the recuperator, and the gas output 5 is either identical to or coupled to the turbine output 72.

As shown in FIG. 1, the compressor input 41 is connected to the suction region 30, which is separated from and bounded by the recuperator by an intake wall 31. The suction region 30 extends away from the compressor 40, and the recuperator 10 is to extend at least partially around the suction region. The suction region 30 is bounded by the intake wall 31, the intake wall 31 also being the boundary of the recuperator. The intake wall 31 is provided with openings for allowing gas, which is present at the second output 12 of the recuperator 10, into the suction region 30. The openings provided in the intake wall thus represent the first recuperator output 12. The intake wall is further configured to provide fluidic separation between the suction region 30 and both the second recuperator input 13 and the second recuperator output 14 (and also with respect to the first recuperator input 11, which is only accessible by gas via the provided path in the recuperator).

Figure 2A:
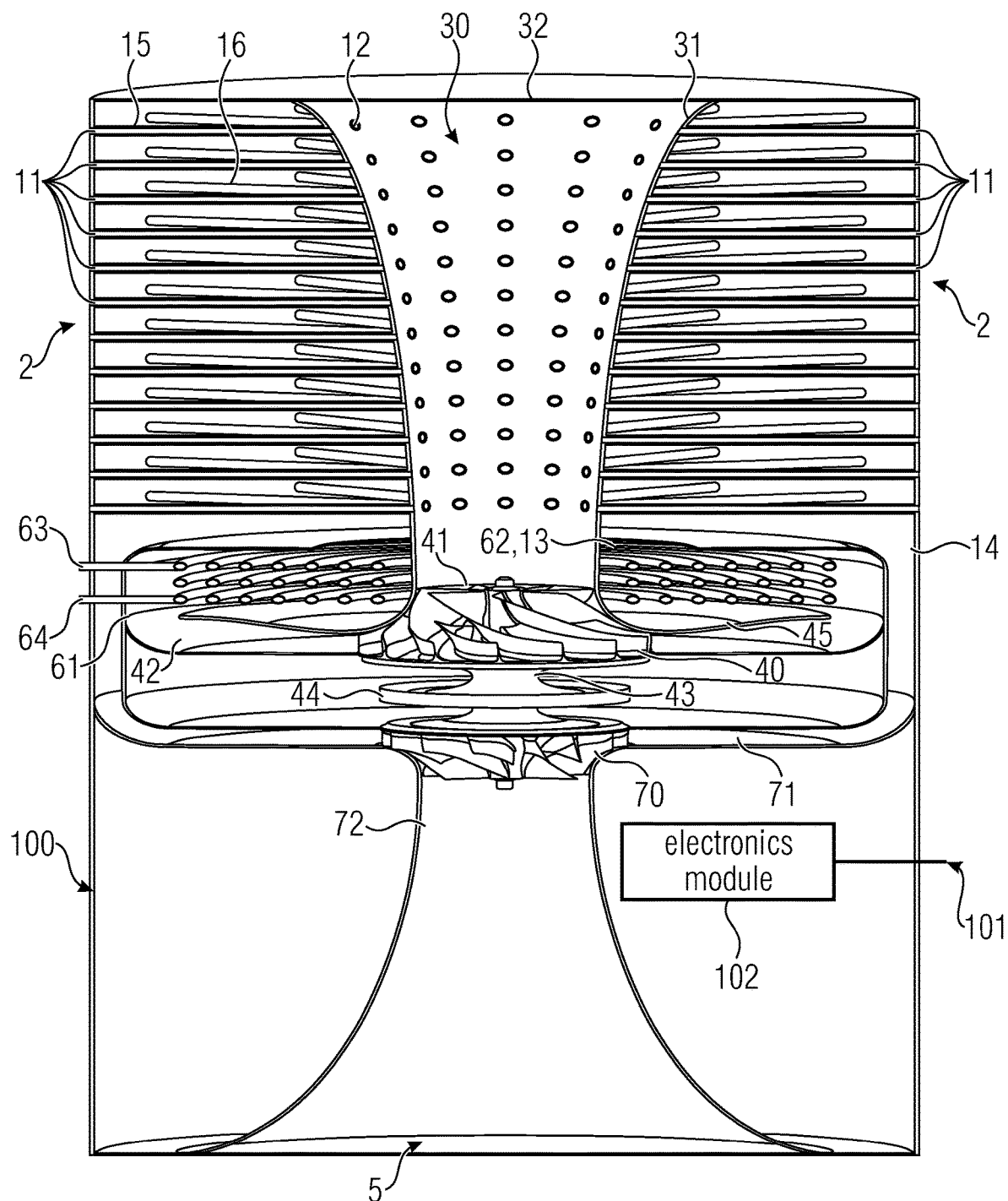
FIG. 2a is a sectional view of a fully integrated gas refrigerating machine according to another embodiment of the present invention.

In advantageous embodiments, the recuperator extends completely around the suction region 30, as shown, for example, in FIG. 2a. In certain embodiments, however, it is sufficient for the recuperator to extend around the suction region by only a portion of the entire angular range of 360°. Thus, an arrangement of the recuperator extending around the suction region 30 by only 90° may be favorable in this respect if the gas refrigerating machine is to be fitted to a corner of a room, for example. Other larger or smaller extensions around the suction region are also conceivable for the recuperator, depending on the implementation. However, an implementation in which the recuperator extends completely, i.e. 360°, around the suction region is particularly efficient.

Here, this is further of advantage for the recuperator to have a circular cross-section in top view. Other cross-sections, such as triangular, square, pentagonal or other polygonal cross-sections in top view are also conceivable, since these recuperators with such cross-sections in top view can also be easily designed with corresponding gas channels in order to achieve a recuperation effect with high efficiency advantageously from all sides.

In an advantageous embodiment of the present invention, the entire gas refrigerating machine is accommodated in a housing, as shown, for example, in FIG. 2a at 100. The gas input 2 is located in an upper region of the housing 100 of FIG. 2a, the housing or the upper housing wall being formed to be identical to the recuperator wall. The gas input 2 thus simultaneously represents the first recuperator input, which is represented by the perforations 11 in the housing wall. As is shown in FIG. 2a, it is of advantage for the recuperator to occupy a considerable part of the height of the entire housing 100, such as between 30 and 60% of the height of the housing. Furthermore, all components of the gas refrigerating machine, i.e. both the compressor 40 and the recuperator 10 as well as the heat exchanger 60 and the turbine 70, are located within the housing 100, as shown in an exemplary, particularly compact implementation in FIG. 2a. Only the connections 63, 64 for the secondary side of the heat exchanger 60 as well as the air inlet 2 and the air outlet 5 are accessible to the outside. In addition, an electronics module 102 with a corresponding connection 101, which is additionally accessible to the outside, is advantageously located below the turbine or below the turbine input 71 or next to the turbine output 72. All the other elements and inputs and outputs etc. are not accessible to the outside in the compact implementation. The gas refrigerating machine in the particularly compact setup of FIG. 2a thus has only an air inlet 2, an air outlet 5, a connection 63, 64 for the secondary side of the heat exchanger 60 and a power/signal connection 101 for the electronics module 102.

The electronics module 102 is advantageously used to provide power to a drive motor for the compressor 40, or to provide control data to an element of the gas refrigerating machine, or to acquire sensor data from an element of the gas refrigerating machine, and is disposed in a region of the gas refrigerating machine configured or suitable to cool the electronics assembly.

As it has been pointed out, the gas refrigerating machine can be used for cooling. In this case, the gas input is connected to a room to be cooled either directly or connected to an area to be cooled via a heat exchanger, and the heat exchanger 60 or the secondary side 63, 64 of the heat exchanger is connected to a heat sink 80, such as a ventilator on the roof of a building or a ventilator outside an area to be cooled.

On the other hand, if the gas refrigerating machine is used to heat a building or an area to be heated, the secondary side 63, 64 of the heat exchanger is connected to, for example, a floor heating system (FHS), or to any heating circuit that may have heating capabilities other than floor heating. In this case, the gas input 2 is connected to a source of hot gas if a direct system is used, or to a heat exchanger connected on its primary side to a heat source, and whose secondary side is formed by the gas input 2 and the gas output 5. In particular, the secondary input of this heat exchanger not shown in FIG. 1 is the gas input 2 and the secondary output is the gas outlet 5 of this heat exchanger not shown in FIG. 1.

With reference to FIG. 2a, particularly advantageous embodiments for the design of the gas refrigerating machine are presented below.

In one implementation, as shown in FIG. 2a, the compressor 40 is arranged upstream of the turbine 70 in the operating direction of the gas refrigerating machine. This has the advantage that warm air in an area to be cooled can be sucked in from above downwards and cold air is discharged downwards into an area to be cooled. This takes into account, for example, the physical property that cold air tends to collect on the floor or in the lower area of a room and warm air tends to collect at the top of the room.

Furthermore, in the embodiment shown in FIG. 2a, the compressor comprises a compressor wheel, and the turbine also comprises a turbine wheel 70a. Advantageously, both wheels are arranged on one and the same axis 43. Furthermore, a rotor 44 of a drive motor is arranged on the axis 43 to provide the additional driving force still entailed beyond the driving force achieved by the turbine. The rotor 44 here cooperates with the stator of a drive motor, which is not shown in FIG. 2a.

Further, as shown in FIG. 2a, the rotor 44 is advantageously disposed between the compressor wheel and the turbine wheel 70a.

Advantageously, the recuperator is arranged in an outer region of a volume of the gas refrigerating machine so that the suction region 30, which is connected to the compressor input 41, can be arranged in the inner region of the recuperator. Then, air is drawn in from all sides, as shown in FIG. 2a, in which schematic cross-sectional view the air inlet 2 is shown on both the left and right sides of the figure. The recuperator 10 thus comprises a volumetric shape having a central region with a central opening forming the suction region 30, the intake wall extending from a first end to a second end, the second end being covered by a cover 32. Therefore, no air or gas flows into the suction region from above, but only from the side through the primary region of the recuperator. The widening from the first end at the compressor input 41 to the second end with the cover plate 32 is a continuous widening with an approximately parabolic or hyperbolic shape, which is to ensure optimum flow patterns within the suction region, to ensure as far as possible a laminar flow, which forms the lowest flow resistance, in the suction region from top to bottom. The slightly greater flow resistance due to longer gas channels in the recuperator closer to the compressor input 41 is compensated for by slightly shorter gas channels further away from the compressor input 41, resulting in almost equal conditions for flow resistance for the entire region from bottom to top along the suction region, so that the recuperator is flowed through equally efficiently throughout its entire volume.

Advantageously, the recuperator 10 is rotationally symmetrical, and an axis of symmetry of the recuperator 10 coincides with an axis of the compressor or an axis of the turbine or an axis of the suction region and/or with an axis of the housing.

Figure 4A:
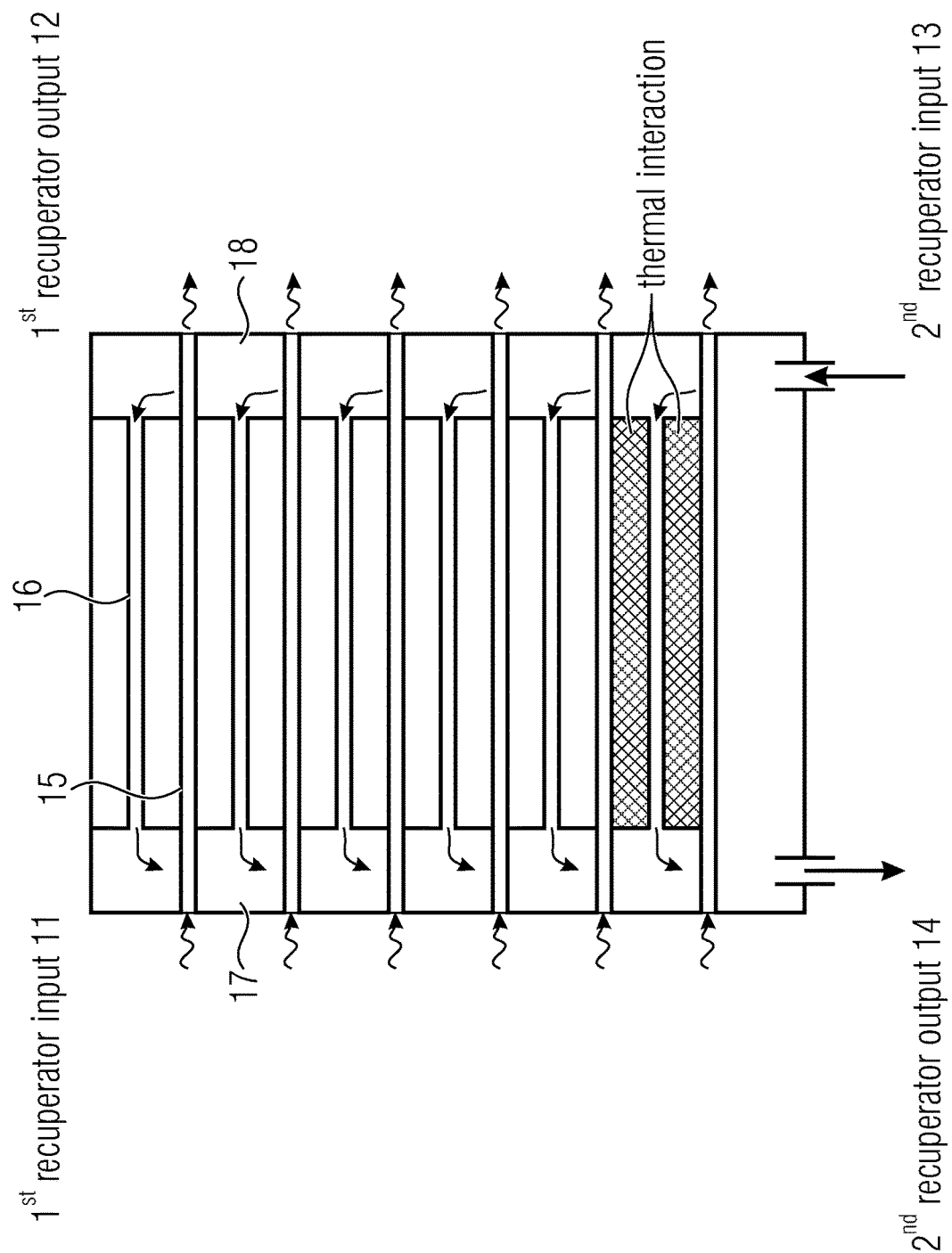
FIG. 4a is a schematic representation of a section of an advantageous recuperator with collection spaces on the secondary side.

In one embodiment, the recuperator is implemented as a counter-flow heat exchanger, which is indicated as one aspect in the schematic diagram of FIG. 4a. In the example in FIG. 4a, representing for example the "left half" or "right half" of the recuperator of FIG. 2a, first gas channels 15 exist from the first recuperator input 11 to the first recuperator output 12. In addition, second gas channels 16 exist, extending between a first collection space 17 on the left in FIG. 4a and between a second collection space 18 on the right in FIG. 4a. The second gas channels 16 thermally interact with the first gas channels 15. Depending on the implementation, i.e. how the secondary side of the recuperator is occupied, the flow direction in the gas channels 16 is in the same direction as the flow in the gas channels 15. Then, the left connection at the bottom left in FIG. 4a is the second recuperator input 13 and the right connection is the recuperator output 14. If, on the other hand, the recuperator is to be operated in counter-flow, which is of advantage, with the flow direction in the flow channels 15 and 16 being opposite to each other, the input on the left in FIG. 4a is the second recuperator output 14 and the connection on the right in FIG. 4a is the second recuperator input 13.

Thermal interaction takes place via material of the recuperator, which is arranged between gas channels 15 and 16, i.e. between a gas channel 15 and a corresponding gas channel 16, i.e. heating of the sucked warm gas at the expense of cooling the gas flowing in the secondary region of the recuperator, which is brought to the turbine for relaxation.

The recuperator includes the collection space 17 to distribute gas supplied via the left connection 4 from the bottom to the top in the embodiment shown in FIG. 4a into the various gas channels. Correspondingly, gas that has flowed through the channels is collected on the other side by the second collection space 18 and withdrawn via the second connection. On the other hand, if the occupancy is different, i.e. in true counter-flow, the collection space 18 ensures the distribution of the gas into the individual gas channels 16 and the collection space 17 causes collection of the gas discharged from the individual channels for the purpose of extraction through the lower connection due to the turbine relaxation effect.

In the advantageous embodiment, the housing in which the compact gas refrigerating machine is arranged is rotationally symmetrical or cylindrical and has a diameter between 0.5 and 1.5 meters and a height between 1.0 and 2.5 meters. In particular, sizes with a diameter between 70 and 90 and especially 80 centimeters are of advantage, and a height between 170 and 190 and advantageously of 180 cm is of advantage in order to create an already significant cooling for, for example, a computer room, which is advantageously implemented as direct air cooling. Furthermore, to ensure an optimal flow distribution, a widening is provided from the turbine output 72 to the gas outlet 5, which also runs in a parabolic or hyperbolic shape, so that a favorable adaptation of the flow conditions from the high speed at the turbine output 72 to an adapted reduced speed at the air outlet 5 is achieved, so that no excessive noise is generated by the cooling.

Advantageously, the housing has an elongated shape, and the gas inlet is formed by a plurality of perforations in an upper region of the housing with respect to the operating direction of the gas refrigerator or a wall of the housing. Furthermore, the gas outlet is formed by an opening in a lower region or in the bottom of the housing, wherein the opening in the bottom of the region corresponds to at least 50% of a cross-sectional area of the housing in the upper region, i.e. in the air inlet. By making the opening of the gas outlet as large as possible, low air velocities at the gas outlet and thus a pleasant noise behavior and also a pleasant "draft" behavior in the room with only low air movement occurrence are achieved.

Advantageously, the compressor 40 is arranged to achieve air movement in the suction region, in the operating direction of the gas refrigerating machine, from top to bottom. The compressor 40 then results in a deflection of the flow from bottom to top, favorably employing here a guide chamber 45 of the compressor which already inherently achieves a 90° deflection at the transition from the compressor wheel to the guide chamber 45. The next 90° is then achieved by feeding the gas, which has been compressed, at the output of the guide chamber from the bottom to the top via the heat exchanger input 61, which is also the compressor output 42. In the second heat exchanger, the gas then moves from the outside to the inside, towards the heat exchanger output 62, which coincides with the input of the recuperator 13. The gas then moves through collection regions, as has been illustrated with reference to FIG. 4a, at first in the recuperator from bottom to top and then at the output of the corresponding gas channels from top to bottom, finally entering the turbine input 71 at the second recuperator output 14. The turbine input 71 is connected, again optimally in terms of flow, in the outer region, i.e. outside the heat exchanger, to the second recuperator output so that as few gas deflections as possible are achieved in order for the gas, without suffering significant losses, to enter the turbine 70, relax in the turbine, drive the turbine accordingly and lose heat through the relaxation process.

Figure 2B:
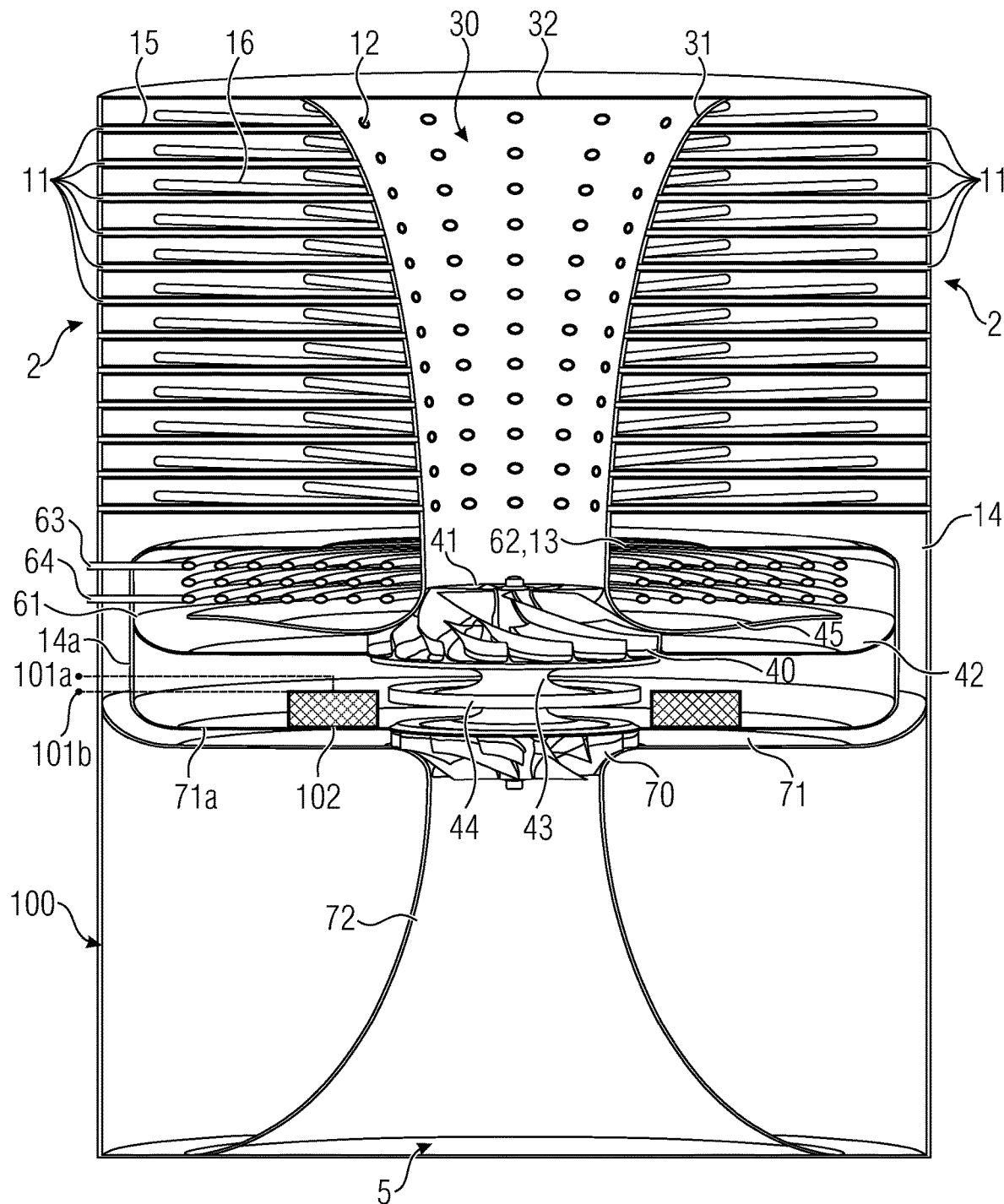
FIG. 2b is a sectional view of a fully integrated gas refrigerating machine according to another embodiment of the present invention with an alternative arrangement of the electronics assembly.

In the advantageous embodiment shown in FIG. 2a or 2b, the turbine output is located at the bottom of the housing. This allows the gas refrigerating machine to be placed on a cooling inlet region in a "double" floor of a data center. Air channels extend from this cooling inlet region into the region to be cooled, such as computer racks. The gas refrigerating machine thus provides a compact measure of feeding cold air into an existing infrastructure of double floor or in-floor air channels extending from the (central) cooling inlet.

Locating the turbine output at the bottom of the gas refrigerating machine is further advantageous in that condensed moisture falls away from the unit downward due to gravity and can be easily collected and discharged without having to elaborate on the protection of the engine from the moisture.

Figure 4B:
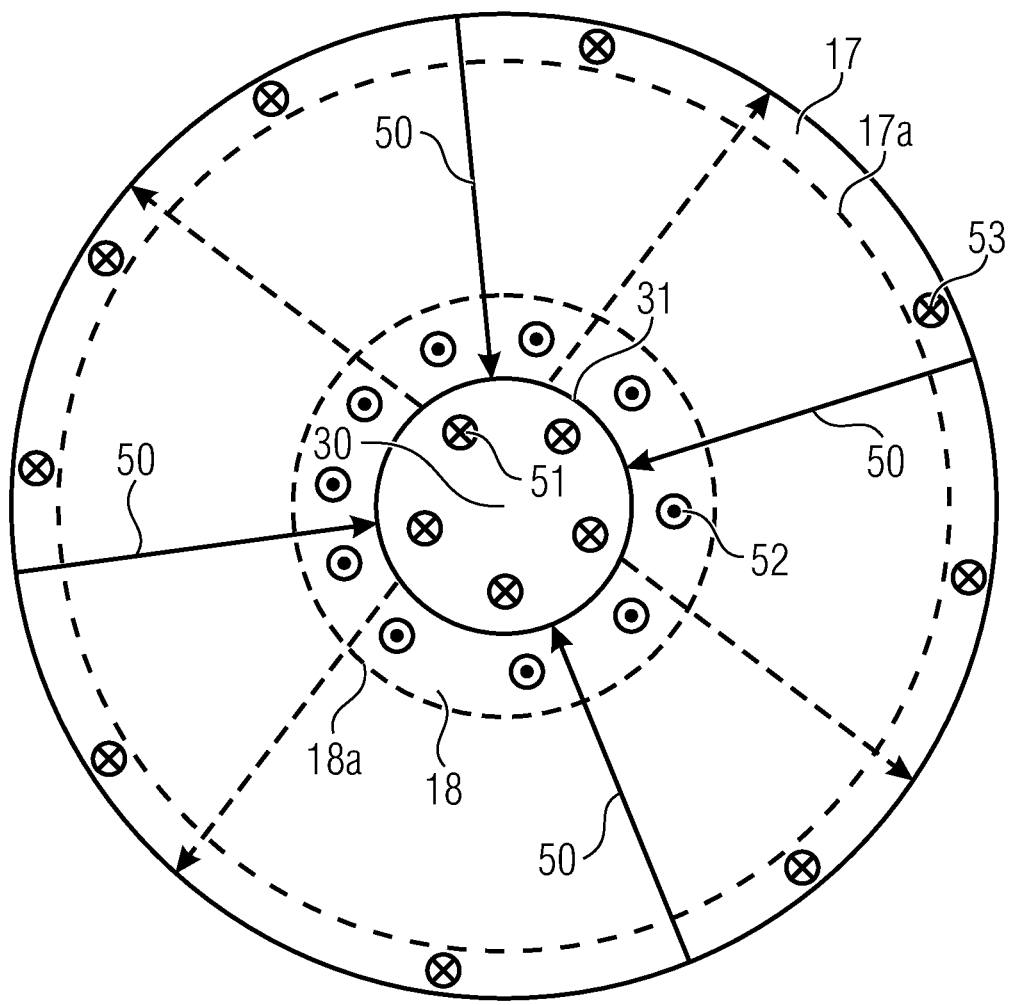
FIG. 4b is a schematic top view of an advantageous recuperator with collection spaces on the secondary side.

FIG. 4b shows a schematic top view of an advantageous recuperator 10 having collection spaces on the secondary side. The top view of FIG. 2a or 2b is schematic. In the embodiment, the gas refrigerating machine is completely closed to the top by a closed lid. FIG. 4b, however, shows the situation when the lid is transparent. In the center, the suction region 30 is shown, which is bounded by the intake wall 31. On the one hand, the boundary 18a for the inner collection space 18 and the boundary 17a for the outer collection space 17 extend around the suction region 30. The gas flow takes place from the outside to the inside, as shown by the arrows 50, i.e. from the first recuperator input 11 to the first recuperator output 12. Then, the gas flows downward in the suction region 30, as shown by the arrow ends 51 in the region 30. The gas is then compressed and flows through heat exchanger 60 to flow into second recuperator input 13. From there, it flows from the bottom to the top, as shown by the arrowheads in the collection chamber 18. The gas then flows back outwards through the recuperator into the collection chamber 17 and downward, as shown by the arrow ends 53. From the collection chamber 17, the gas then enters the turbine input 71 via the 2nd recuperator output 14.

It should be noted that, depending on the implementation, the flow directions can also be designed differently, as long as the lines 15 on the one hand and 16 on the other hand are separated from each other in the recuperator 10, so that essentially no short-circuiting of the gas flows takes place. In the same way, the collection spaces 17, 18 are separated from the lines 15. In the embodiment shown, the collection spaces 17, 18 are associated with the lines 16 which connect the second recuperator input 13 to the second recuperator output 14. Alternatively, the implementation may be such that the collection spaces are associated with the first recuperator input and the first recuperator output and the second input and the second recuperator output are gas-isolated from the collection spaces.

Advantageously, the heat exchanger 60 has a disc-shaped volume, and the heat exchanger input is located outside the disc-shaped volume and the heat exchanger output is located inside the disc-shaped volume. Furthermore, the heat exchanger input is advantageously located at the bottom of the heat exchanger and the heat exchanger output is located at the top of the disc-shaped volume. In other embodiments, it is of advantage to form the heat exchanger wedge-shaped in cross-section, wherein a cross-section of the heat exchanger input 61 is formed to be larger than a cross-section of the heat exchanger output 62. This results in an advantageously rotationally symmetrical heat exchanger, which is formed to be somewhat annular as in FIG. 2a, but whose outer boundary of the ring cross section in FIG. 2b is larger than the inner boundary, wherein the heat exchanger does not have to be arranged horizontally as in FIG. 2a, for example, but can be arranged obliquely from bottom to top.

Figure 4C:
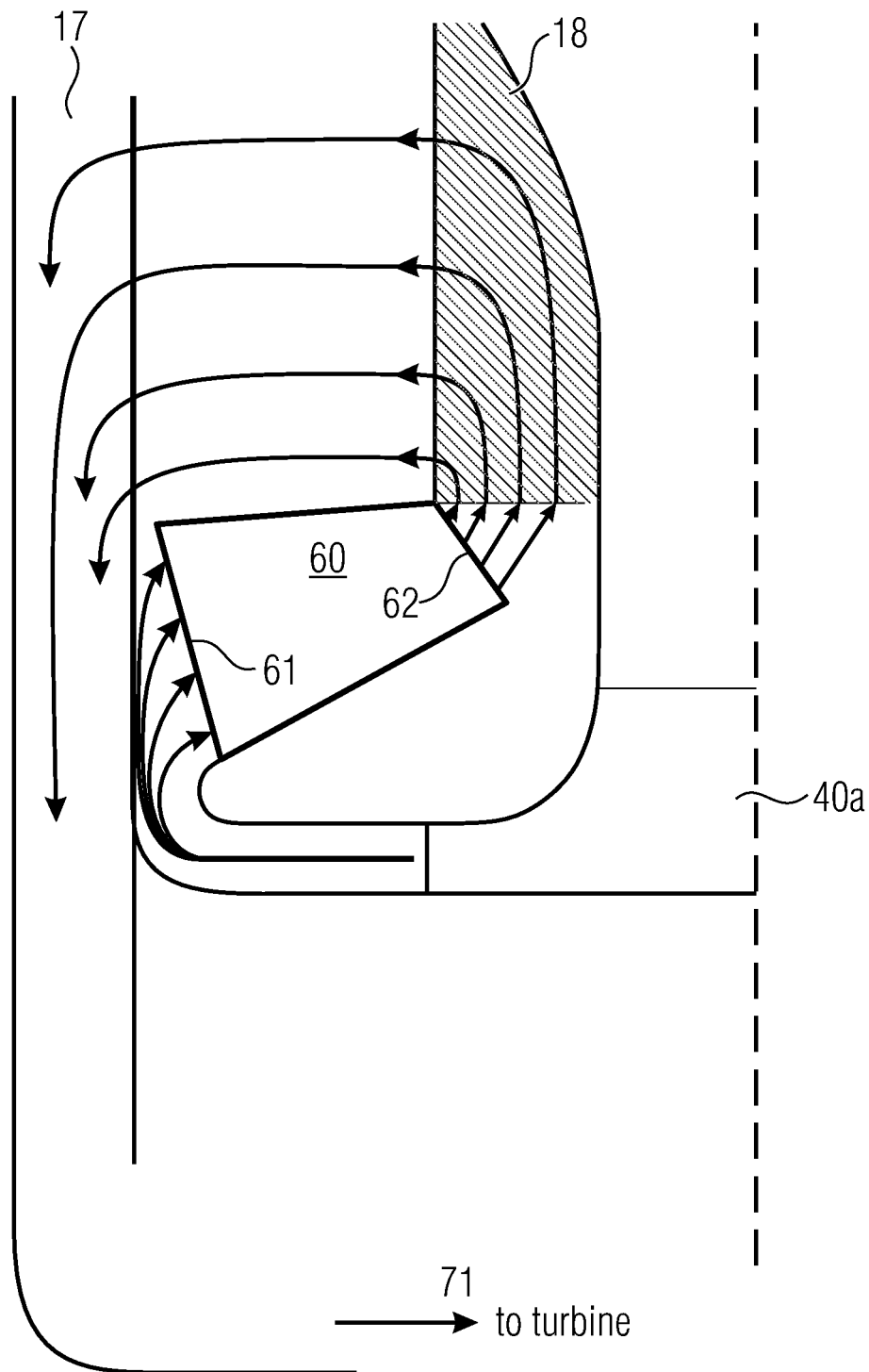
FIG. 4c is a schematic cross-sectional view of a cross-sectionally wedge-shaped heat exchanger with a larger input cross-section and a smaller output cross-section.
Figure 5:
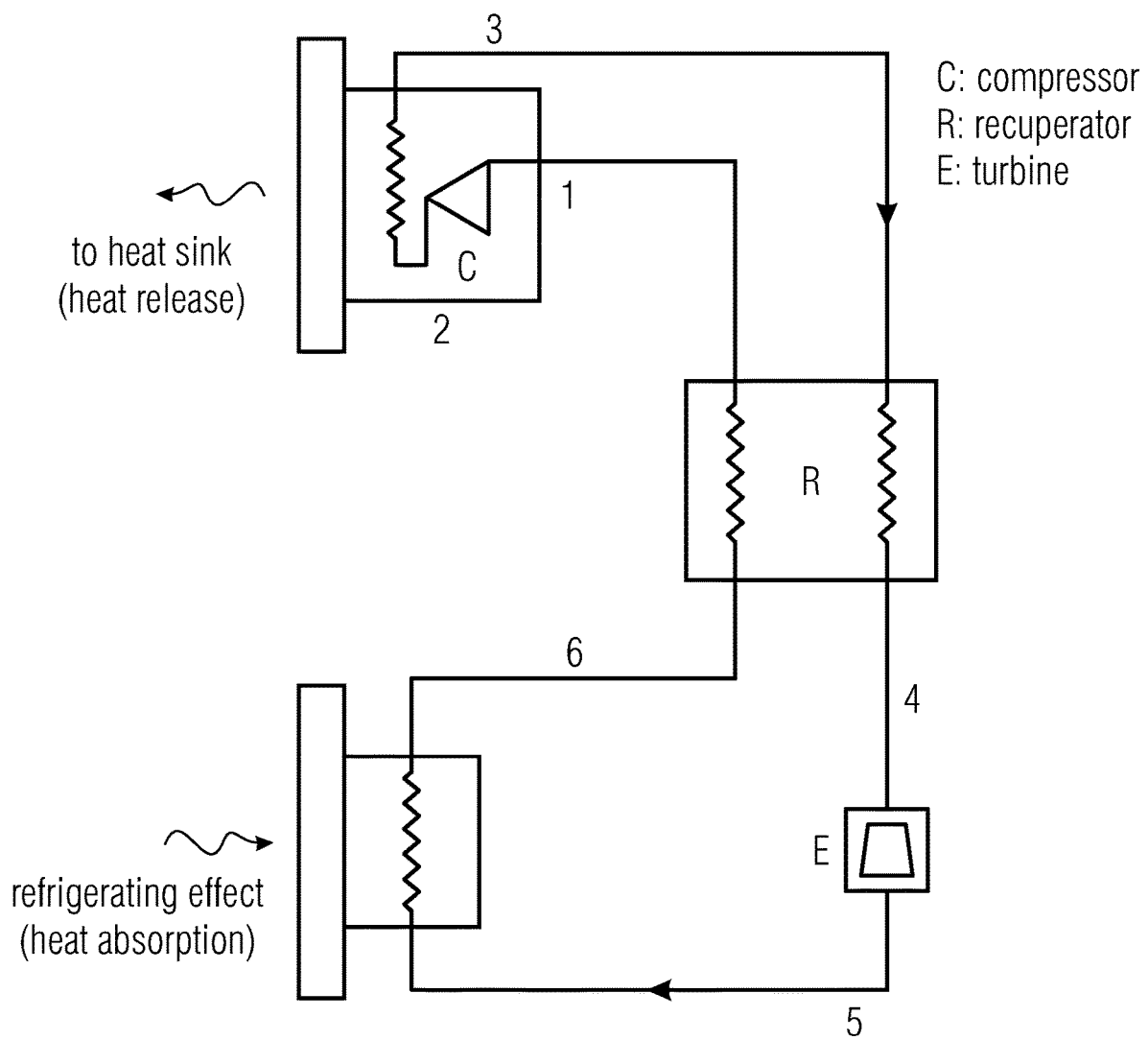
FIG. 5 is a schematic representation of a known cold air refrigerating machine.
Figure 6:
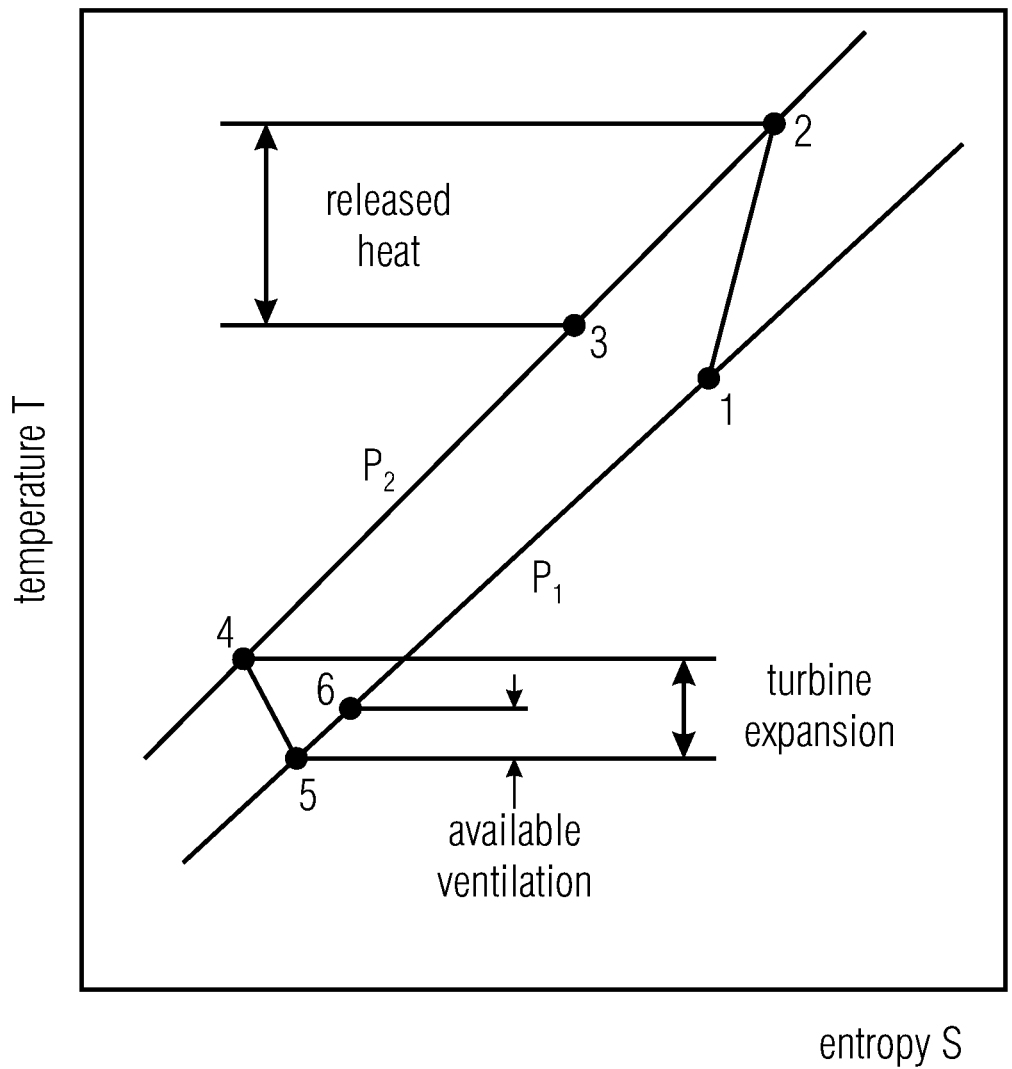
FIG. 6 is a temperature-entropy diagram of the known cold air refrigerating machine of FIG. 5.

FIG. 4c shows a section of one side of this implementation relative to the recuperator 10 and compressor 40 and turbine 70 of FIG. 2a or 2b. Only a schematic representation of one side of the cross-section is shown, with the larger input 61 and the smaller output 62 in the cross-sectional view, and further illustrating the flow of gas from the output 62 into collection region 18, through the recuperator 10 into collection region 17, and from there past the heat exchanger 60 into the turbine input.

Figure 3:
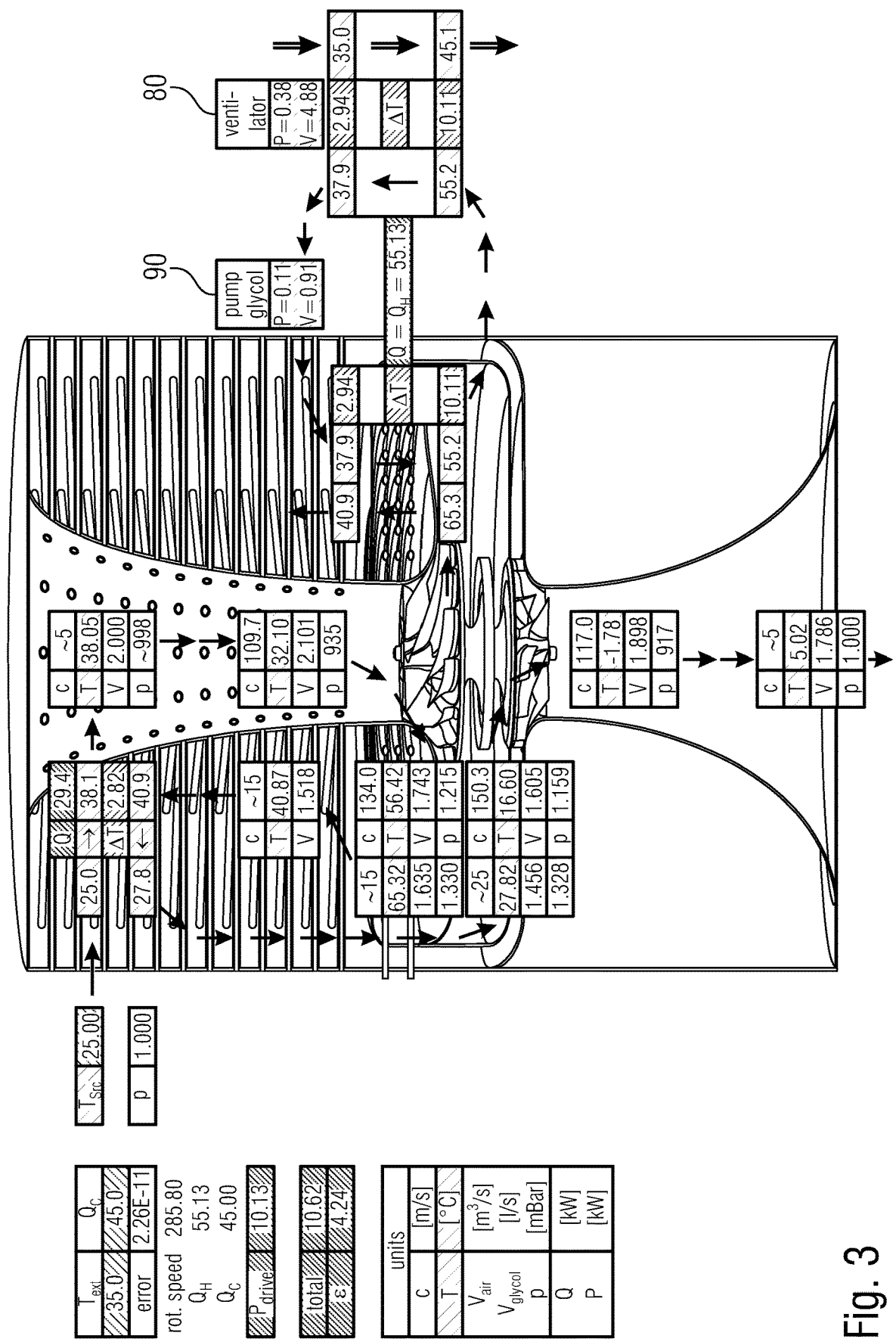
FIG. 3 is a representation of different temperature/pressure/volume flow ratios at different points in the gas refrigerating machine.

A liquid, such as a water/glycol mixture, which carries the waste heat to the heat sink 80 advantageously flows in the secondary side of the heat exchanger, the input of which represents the line 63 and the output of which represents the line 64. The medium cooled in the heat sink 80, which may be, for example, a liquid/air heat exchanger with a ventilator on a roof, is fed back into the input 63 of the secondary side of the heat exchanger 60 by the pump 90, as is also shown in FIG. 3. Therefore, in the heat exchanger 40, in the region through which the gas flows, there are advantageously spiral liquid lines to remove and dissipate heat from the gas as efficiently as possible.

Advantageously, the suction region extends by a distance greater than 10 cm and advantageously greater than 60 cm away from the compressor input. Furthermore, the gas channels are arranged such that they are distributed substantially evenly over the volume on all sides and can thus feed as much air as possible with low resistance into the suction region as efficiently as possible.

FIG. 3 shows a diagram illustrating the various ratios of velocity c, temperature T, volume V and pressure p. In addition, the thermal power Q and the electrical power P are also shown, each in kW.

It is assumed, for example, that air enters the recuperator input 11 at a pressure of 1.0 bar and a temperature $T_{src}$ of 25° C. There, the air enters the suction region at a velocity of about 5 meters per second, with the conditions shown at the top of the suction region. Thermal interaction in the recuperator heats this air from 25° C. to 38.5° C., with only a minimal pressure drop. Suction in the suction region increases the velocity from a velocity of 5 m/s to about 109 m/s, which is accompanied by a slight temperature reduction from 38° C. to 32° C. and a small pressure reduction. However, the compressor action then brings the air to a temperature of 56° C. and a slightly higher pressure of 1.2 bar, with an additional increase in velocity. This high velocity is reduced in the heat exchanger to a velocity of about 15 m/s, and the temperature is reduced from 56° C. to about 40° C. by the action of the heat exchanger. The action of the recuperator reduces this temperature at the secondary input 13 of the recuperator to a temperature of about 16° C. at the turbine input. At the turbine outlet, a temperature reduction to −1.78° C. takes place due to the relaxation, with the velocity at the turbine input reducing from 150 m/s to 117 m/s, with this velocity then dropping to about 5 m/s towards the air output, which is accompanied by a temperature increase to about 5.0° C. Compared to the input side air temperature of 25° C., this air provides cooling which can be increased or reduced as required by turning the compressor faster or slower. On the output side, i.e. with respect to the heat exchanger, the ratios are also shown. Liquid with a temperature of 55° C. is coupled out, wherein the liquid mixture, i.e. the glycol/water mixture is reduced by the ventilator in the heat sink 80 to, for example, 37.9° C. and is fed back accordingly to the secondary input 63 of the heat exchanger.

In a method of operating the gas refrigerating machine according to the present invention, the gas refrigerating machine is operated such that the suction is achieved through the suction region 30 specifically projecting into the recuperator.

In a method of manufacturing the gas refrigerating machine, the individual elements are formed and arranged so as to achieve the particular advantageous arrangement of the suction region in the volume of the recuperator.

Although it is not shown in FIGS. 1 to 6, the recuperator can also be implemented with other heat exchanger technologies, i.e., with a heat exchanger that does not operate in counter flow, for example, and in which the gas channels are not parallel to each other or are arranged perpendicular to the housing direction or in a horizontal operating direction.

Also, the compressor and the turbine do not necessarily have to be located on the same axis, but other measures can be taken to use the energy released by the turbine to drive the compressor.

Furthermore, the heat exchanger does not necessarily have to be located in the housing between the recuperator and the turbine or between the recuperator and the compressor. The heat exchanger could also be connected externally, although an arrangement located in the housing is of advantage for a compact design.

Furthermore, the compressor and the turbine do not necessarily have to be implemented as radial wheels, although this is of advantage since a favorable power adjustment can be achieved by continuously controlling the number of revolutions of the compressor via the electronics module 102 of FIG. 2a.

Depending on the embodiment, the compressor can be designed as shown in FIG. 2a as a turbo compressor with radial wheel and with a guide path or guide chamber 45, which achieves a 180° deflection of the gas flow. However, other gas routing measures can also be achieved via a different shaping of the guide chamber, for example, or via a different shaping of the radial wheel, in order to still achieve a particularly efficient setup which results in good efficiency.

Particular reference is made to the extraordinarily high efficiency $\epsilon$ of 4.24, which is obtained, for example, at the corresponding still moderate numbers of revolutions of 285.8 revolutions per second in FIG. 3.

In addition, reference is made to the particularly favorable temperature swing which results although a temperature of 25° C. is fed. Despite this relatively high temperature, a low temperature close to the freezing point is achieved with a still moderate number of revolutions of the compressor. Furthermore, the temperature requirements on the secondary side are not critical. Although a relatively warm water/glycol mixture of 37.9° C. is fed, heat dissipation can still be achieved, resulting in a heated water/glycol mixture of about 55° C. This means that even in very hot climates, safe heat dissipation can still be achieved via an outdoor dissipator.

Figure 7A:
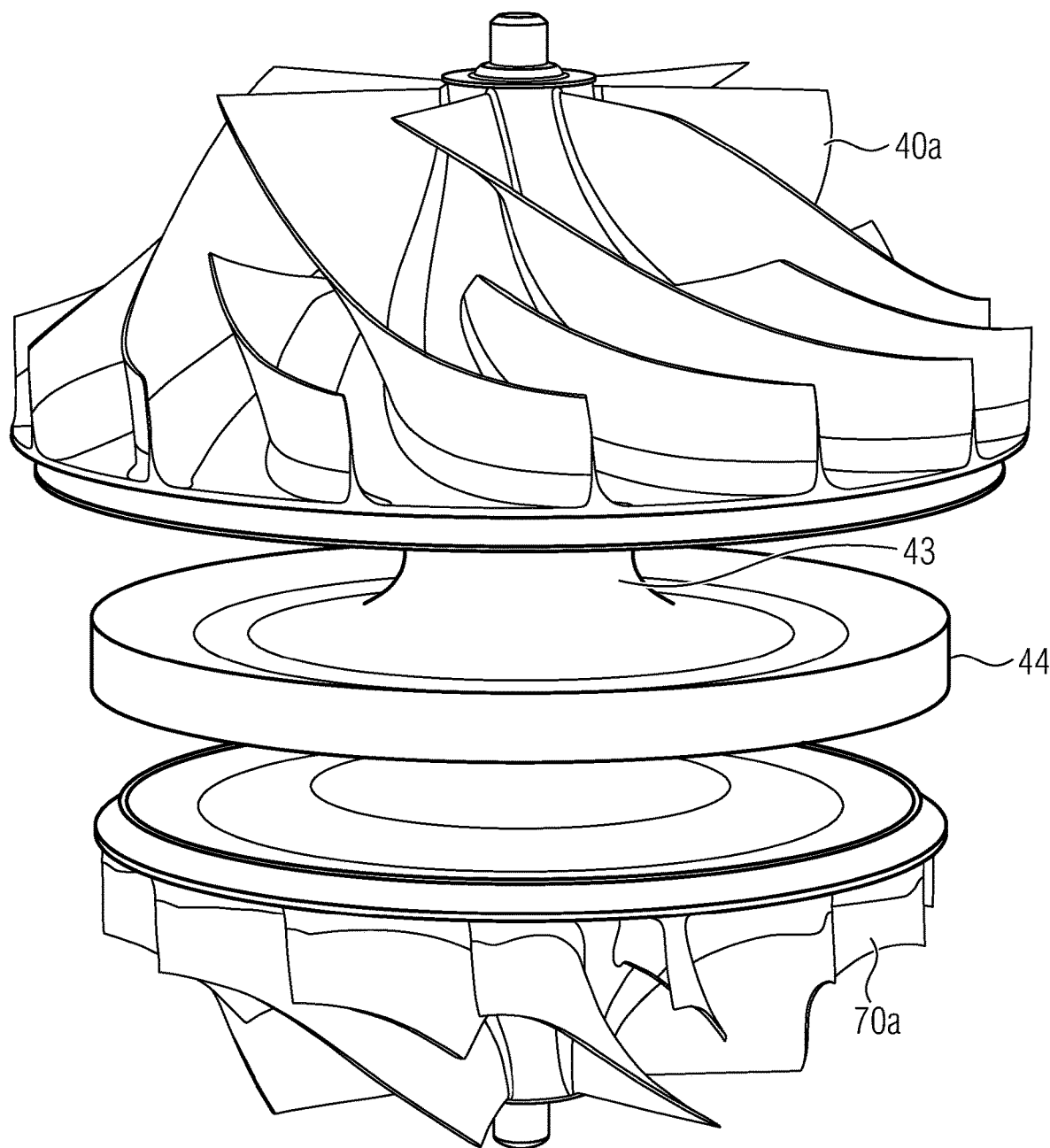
FIG. 7a is a perspective view of an advantageous compressor-turbine combination.
Figure 7B:
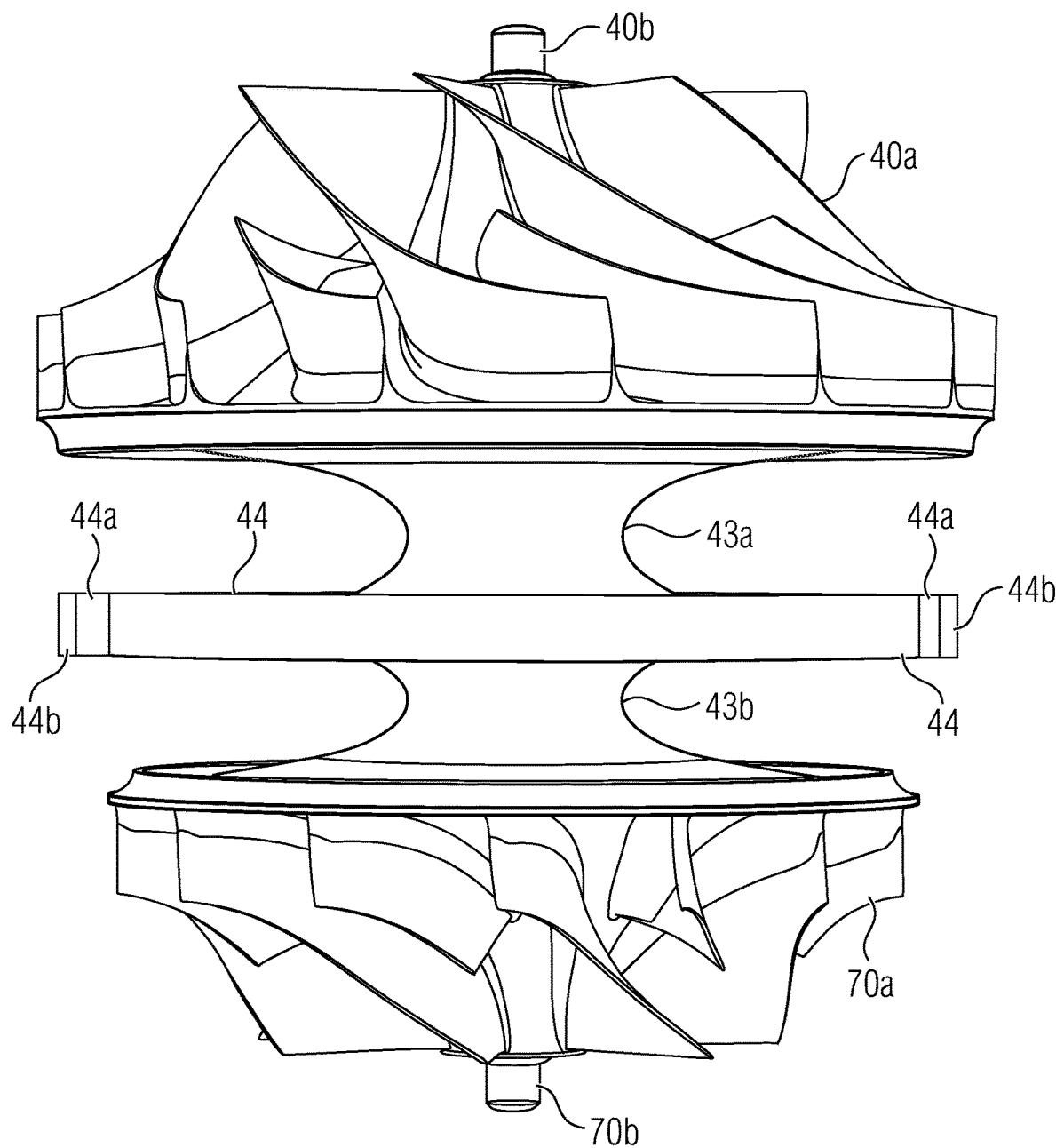

FIG. 7a shows a perspective view of an advantageous compressor-turbine combination and FIG. 7b shows a side view of the advantageous compressor-turbine combination of FIG. 7a. The combination is advantageously designed as a monolithic unit or formed integrally of the same material. It includes an upper or first bearing region 40b to which the compressor wheel 40a is attached. The compressor wheel 40a merges into a first intermediate region 43a, also shown as an axis 43. This axis region 43a in turn merges into the rotor 44, which in turn merges into another intermediate region 43b. Connected to this is the turbine wheel 70a which is suspendable via a lower bearing portion 70b. The suspensions for the bearing regions are attached to the wall of the suction region 30 of FIG. 2a or FIG. 2b for the first bearing region 40b, and the bearing region 70b for the turbine wheel 70a is attached to a suspension in the turbine output 72. Advantageously, roller or ball bearings are used as bearings.

In advantageous embodiments, the combination is formed of a material such as aluminum or plastic, and the rotor 44 is surrounded by a ferromagnetic back ring to which the magnets are attached, for example by adhesive, to form a motor gap with a stator not shown in FIG. 7a or FIG. 7b.

As it is further shown in FIG. 7b, the combination is dimensioned such that the diameter of the compressor wheel 40a is larger than the diameter of the rotor 44, and such that the diameter of the rotor 44 (advantageously without back iron 44a and magnets 44b) is equal to or larger than the diameter of the turbine wheel 70a. Thus, easier assemblability is achieved because the gas refrigerating machine can be assembled with the combination in FIG. 7a or 7b with respect to FIG. 2a or 2b advantageously from the bottom to the top. In addition, it is possible to slide a back ring 44a over the turbine wheel 70a and attach it to the rotor 44 at its periphery. Assembly advantageously takes place from the bottom up, using the element with the turbine output 71 as a base, onto which the inner boundary of the recuperator output 14 is placed. The combination of turbine wheel 70a and compressor wheel is then placed on top of this and inserted into the bearing support for the lower bearing portion 70b. Then, the suction region 30 together with the guide chamber 45 and the heat exchanger 60 and the recuperator 10 arranged thereabove can easily be mounted by placing the upper bearing support on the protruding bearing portion 40b.

FIG. 2b shows a sectional view of a fully integrated gas refrigerating machine according to a further embodiment of the present invention with an alternative arrangement of the electronics module 102 with respect to FIG. 2a. While in FIG. 2a the electronics module is mounted in the cool area adjacent the turbine output, in FIG. 2b it is arranged in the so-called "engine room" between the base of the compressor wheel 40a of FIG. 7b and the base of the turbine wheel 70a. In particular, the arrangement of the module 102 on the upper boundary 71a of the turbine input 71 is of advantage because this area is well cooled due to the gas coming from the heat exchanger, which in the scenario of FIG. 3 is only 27 or 16° Celsius. Any heat lost from the motor or any waste heat from the electronics or sensors in the module is therefore easily dissipated through the turbine 70.

Advantageously, the electronics module 102 for electrically supplying power and/or control signals to the gas refrigerating machine has an opening at the center and is disk-shaped and extends around a stator of a drive motor for the compressor 40 or is formed integrally with the stator, and is further exemplarily disposed in a region between a base of a compressor wheel 40a of the compressor 40 and a base of a turbine wheel 70a of the turbine.

Although an annular assembly is shown in cross-section in FIG. 2b, the assembly may be formed in any manner as long as it is accommodated in the engine casing and is in thermal interaction with the boundary 71a of the input 71 of the turbine 70, e.g., is attached to the boundary 71a. In this regard, it is further of advantage to route the supply line for power 101a and data 101b for the engine through the lateral boundary 14a of the recuperator output 14 and through the housing 100 at the appropriate location, as is shown, for example, in FIG. 2b.

Although some aspects have been described in the context of an apparatus, it is understood that these aspects also represent a description of the corresponding method so that a block or component of an apparatus is also to be understood as a corresponding method step or feature of a method step. In analogy, aspects described in connection with or as a method step also constitute a description of a corresponding block or detail or feature of a corresponding apparatus. Some or all of the method steps may be performed by (or using) a hardware apparatus, such as a microprocessor, a programmable computer, or an electronic circuit. In some embodiments, some or more of the most important method steps may be performed by such an apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A gas refrigerating machine comprising:
   an input for a gas to be cooled;
   a recuperator;
   a compressor comprising a compressor input, the compressor input being coupled to a first recuperator output;
   a heat exchanger;
   a turbine; and
   a gas output,
   wherein the recuperator is rotationally symmetrical, wherein an axis of symmetry of the recuperator coincides with an axis of the compressor, or an axis of the turbine, or an axis of a rotor of a drive motor, or an axis of the gas output, or an axis of the input for the gas to be cooled, or an axis of a suction region of the recuperator, and
   wherein a housing comprises an elongated shape, the input for the gas to be cooled comprises a plurality of perforations in an upper portion with respect to an operating direction of the gas refrigerating machine of the housing or a wall of the recuperator, and the gas output comprises an opening in a lower region of the housing with an opening area which is at least 50% of a cross-sectional area of the housing in the upper region, or
   wherein the recuperator comprises interconnected first gas channels from a first recuperator input to the first recuperator output and comprises second interconnected gas channels between a second recuperator input and a second recuperator output, wherein the first gas channels and the second gas channels are arranged in thermal interaction, the recuperator comprising, at the second recuperator input, a first collection region connecting the second gas channels on one side and extending along an inner region and forming the second recuperator input, and a second collection region connecting the second gas channels on another side and extending along an edge portion of an outer region and forming the second recuperator output, wherein an intake wall delimits the first collection region and separates the first collection region from the suction region, or wherein the turbine comprises a turbine input, and wherein the turbine input is connected to a second recuperator output via a connection region, the connection region extending around the heat exchanger, or wherein the recuperator comprises a volume completely enclosing a suction region, the suction region and the volume of the recuperator extending by a distance greater than 10 cm away from the compressor input, and wherein the input for the gas to be cooled is formed by first ends of first gas channels, wherein second ends of the first gas channels open into the suction region, and wherein the first gas channels are distributed throughout the volume to direct gas into the suction region from multiple sides.

2. The gas refrigerating machine according to claim 1, wherein the compressor comprises the compressor input and a compressor output, wherein the heat exchanger comprises a first heat exchanger input and a first heat exchanger output on a primary side, a second heat exchanger input and a second heat exchanger output on a secondary side, wherein the first heat exchanger input is coupled to the compressor output, and wherein the first heat exchanger output is coupled to the second recuperator input, and wherein the turbine comprises a turbine output, wherein the turbine input is connected to the second recuperator output, and wherein the gas output is coupled to the turbine output.

3. The gas refrigerating machine according to claim 1, wherein the compressor input is connected to the suction region delimited by the intake wall and extending away from the compressor, and wherein the recuperator extends at least partially around the suction region and is delimited by the intake wall.

4. The gas refrigerating machine according to claim 1, configured such that suction of warm gas takes place at a first portion of the housing of the gas refrigerating machine and a discharge of gas cooler when compared to the warm gas takes place at a second portion of the housing of the gas refrigerating machine, wherein the first portion is arranged above the second portion in the operating direction.

5. The gas refrigerating machine according to claim 1, wherein the compressor comprises a compressor wheel, wherein the turbine comprises a turbine wheel, and wherein the compressor wheel comprises a larger diameter than the rotor of the drive motor or a larger diameter than the turbine wheel of the turbine.

6. The gas refrigerating machine according to claim 5, wherein the rotor is arranged between the compressor wheel and the turbine wheel, or wherein the compressor wheel, a first axis portion, the rotor, a second axis portion, and the turbine wheel are formed integrally, or wherein a first bearing portion is formed on the compressor wheel and a second bearing portion is formed on the turbine wheel, or wherein the rotor is formed of a non-ferromagnetic material, such as aluminum, and a ferromagnetic back element is disposed around the rotor and magnets are disposed on the back element.

7. The gas refrigerating machine according to claim 1, wherein the recuperator is arranged in an outer region of a volume of the gas refrigerating machine and the compressor input is arranged in an inner region of the volume of the gas refrigerating machine.

8. The gas refrigerating machine according to claim 1, wherein the recuperator comprises a volumetric shape comprising a central opening located in a central region, forming the suction region, wherein the intake wall extends from a first end of the central opening forming the compressor input to a second end closed by a cover.

9. The gas refrigerating machine according to claim 1, wherein the suction region comprises a continuously increasing opening area from a first end to a second end, and the intake wall is formed to be continuous or steeples, or wherein the compressor, or the turbine, or the rotor of the drive motor, or the gas output, or the input for the gas to be cooled, or the suction region of the recuperator is rotationally symmetrical around a further axis of symmetry, and the further axis of symmetry coincides with the axis of symmetry.

10. The gas refrigerating machine according to claim 1, wherein the compressor comprises a compressor wheel and the turbine comprises a turbine wheel, wherein the compressor wheel and the turbine wheel are arranged on a common axis, wherein the rotor of the drive motor is arranged on the common axis, which interacts with a stator of the drive motor, and wherein the common axis coincides with the axis of symmetry.

11. The gas refrigerating machine according to claim 1, wherein the recuperator comprises a counter-flow heat exchanger.

12. The gas refrigerating machine according to claim 11, wherein through the input for the gas to be cooled, the gas moves from the outside to the inside and gas discharged from the counter-flow heat exchanger moves from the inside to the outside.

13. The gas refrigerating machine according to claim 1, wherein the housing comprises a side wall and a bottom wall or a top wall, wherein the input for the gas to be cooled is arranged in the side wall and the gas outlet is arranged in the bottom wall or the top wall, or wherein the gas output is formed in a bottom of the gas refrigerating machine in the operating direction and is shaped such that the gas output can be placed on a refrigerant gas inlet in a bottom of a room in which the gas refrigerating machine can be installed, or wherein the gas output is formed in a bottom of the gas refrigerating machine in the operating direction, and further a moisture collecting device is provided to collect a condensate formed in the gas output.

14. The gas refrigerating machine according to claim 1, wherein the housing is rotationally symmetrical or cylindrical or comprises a diameter between 0.5 m and 1.5 m or a height between 1.0 m and 2.5 m.

15. The gas refrigerating machine according to claim 1, wherein the turbine comprises a turbine output, and wherein the turbine output comprises a smaller opening area than the gas output, an opening area continuously widening from the turbine output to the gas output.

16. The gas refrigerating machine according to claim 1, wherein the compressor is arranged to move gas via the suction region into the compressor input from top to bottom, and to feed compressed gas from the bottom into the heat exchanger with an output-side guide chamber.

17. The gas refrigerating machine according to claim 1, wherein the heat exchanger comprises a wedge-shaped or disc-shaped volume and a heat exchanger input is arranged on the outside of the wedge-shaped or disc-shaped volume and a heat exchanger output is arranged on the inside of the wedge-shaped or disc-shaped volume, or wherein the heat exchanger input is arranged at the bottom of the wedge-shaped or disc-shaped volume and the heat exchanger output is arranged at the top of the wedge-shaped or disc-shaped volume.

18. The gas refrigerating machine according to claim 1, wherein the volume of the recuperator comprises a counter-flow heat exchanger structure in the outer region and follows the suction region in the inner region, wherein the first recuperator input is arranged on the outside of the outer region, wherein the first recuperator output is arranged at the inner region to direct gas into the suction region, wherein the second recuperator input is also arranged at the inner region and the second recuperator output is also arranged at the outer region,
wherein the first recuperator input and the second recuperator output are fluidically separated in the recuperator and the first recuperator output and the second recuperator input are fluidically separated in the recuperator.

19. The gas refrigerating machine according to claim 1, wherein the heat exchanger is arranged between the recuperator and the compressor.

20. The gas refrigerating machine according to claim 1, wherein the heat exchanger is a gas-liquid heat exchanger and comprises a conduit structure in a volume through which gas flows, through which liquid can flow, the liquid structure being coupled to a secondary input and a secondary output of the heat exchanger.

21. The gas refrigerating machine according to claim 20, wherein the housing comprises a liquid outlet from the heat exchanger and a liquid inlet to the heat exchanger.

22. The gas refrigerating machine according to claim 21, wherein the liquid inlet and liquid outlet are connected to a heat sink, wherein a pump is disposed in a circuit with the heat sink.

23. The gas refrigerating machine according to claim 1, wherein an electronics module for supplying power to the drive motor for the compressor or for providing control data to an element of the gas refrigerating machine or for acquiring sensor data from an element of the gas refrigerating machine is disposed in a region of the gas refrigerating machine configured to cool the electronics module, or
wherein the turbine comprises a turbine output, and wherein an electronics module for electrically supplying the gas refrigerating machine with power and/or control signals is arranged in an area between the turbine output and the gas output and a housing wall of a housing outside the gas output, or
wherein the compressor comprises a compressor wheel, wherein the turbine comprises a turbine wheel, and wherein an electronics module for electrically supplying power and/or control signals to the gas refrigerating machine is disposed in a region between a base of the compressor wheel and a base of the turbine wheel, or
wherein an electronics module for electrically supplying power and/or control signals to the gas refrigerating machine is disposed on a boundary member of the turbine input and outside of the turbine input, or
wherein an electronics module for electrically supplying power and/or control signals to the gas refrigerating machine comprises an opening in the center and is disk-shaped and extends around a stator of the drive motor for the compressor or is formed integrally with the stator, or wherein the compressor comprises a compressor wheel, wherein the turbine comprises a turbine wheel, and wherein an electronics module for electrically supplying power and/or control signals to the gas refrigerating machine comprises an opening in the center and is disk-shaped and extends around a stator of the drive motor for the compressor or is formed integrally with the stator, and is disposed in a region between a base of the compressor wheel of the compressor and a base of the turbine wheel of the turbine.

24. A method for operating a gas refrigerating machine comprising: an input for a gas to be cooled; a recuperator; a compressor comprising a compressor input, the compressor input being coupled to a first recuperator output; a heat exchanger coupled to a compressor output; a turbine; and a gas output, the recuperator being rotationally symmetrical, comprising:
operating the gas refrigerating machine such that an axis of symmetry of the recuperator coincides with an axis of the compressor, or an axis of the turbine, or an axis of a rotor of a drive motor, or an axis of the gas output, or an axis of the input for the gas to be cooled, or an axis of a suction region of the recuperator,
wherein a housing comprises an elongated shape, the input for the gas to be cooled comprises a plurality of perforations in an upper portion with respect to an operating direction of the gas refrigerating machine of the housing or a wall of the recuperator, and the gas output comprises an opening in a lower region of the housing with an opening area which is at least 50% of a cross-sectional area of the housing in the upper region, or
wherein the recuperator comprises interconnected first gas channels from a first recuperator input to the first recuperator output and comprises second interconnected gas channels between a second recuperator input and a second recuperator output, wherein the first gas channels and the second gas channels are arranged in thermal interaction, the recuperator comprising, at the second recuperator input, a first collection region connecting the second gas channels on one side and extending along an inner region and forming the second recuperator input, and a second collection region connecting the second gas channels on another side and extending along an edge portion of an outer region and forming the second recuperator output, wherein an intake wall delimits the first collection region and separates the first collection region from the suction region, or
wherein the turbine comprises a turbine input, and wherein the turbine input is connected to a second recuperator output via a connection region, the connection region extending around the heat exchanger, or
wherein the recuperator comprises a volume completely enclosing a suction region, the suction region and the volume of the recuperator extending by a distance greater than 10 cm away from the compressor input, and wherein the input for the gas to be cooled is formed by first ends of first gas channels, wherein second ends of the first gas channels open into the suction region, and wherein the first gas channels are distributed throughout the volume to direct gas into the suction region from multiple sides.

25. A method for manufacturing a gas refrigerating machine comprising:
an input for a gas to be cooled; a recuperator; a compressor comprising a compressor input, the compressor input coupled to a first recuperator output; a heat exchanger coupled to a compressor output; a turbine; and a gas output, the recuperator being rotationally symmetrical, comprising:

arranging the gas refrigerating machine such that an axis of symmetry of the recuperator coincides with an axis of the compressor, or an axis of the turbine, or an axis of a rotor of a drive motor, or an axis of the gas output, or an axis of the input for the gas to be cooled, or an axis of a suction region of the recuperator, wherein a housing comprises an elongated shape, the input for the gas to be cooled comprises a plurality of perforations in an upper portion with respect to an operating direction of the gas refrigerating machine of the housing or a wall of the recuperator, and the gas output comprises an opening in a lower region of the housing with an opening area which is at least 50% of a cross-sectional area of the housing in the upper region, or wherein the recuperator comprises interconnected first gas channels from a first recuperator input to the first recuperator output and comprises second interconnected gas channels between a second recuperator input and a second recuperator output, wherein the first gas channels and the second gas channels are arranged in thermal interaction, the recuperator comprising, at the second recuperator input, a first collection region connecting the second gas channels on one side and extending along an inner region and forming the second recuperator input, and a second collection region connecting the second gas channels on another side and extending along an edge portion of an outer region and forming the second recuperator output, wherein an intake wall delimits the first collection region and separates the first collection region from the suction region, or wherein the turbine comprises a turbine input, and wherein the turbine input is connected to a second recuperator output via a connection region, the connection region extending around the heat exchanger, or wherein the recuperator comprises a volume completely enclosing a suction region, the suction region and the volume of the recuperator extending by a distance greater than 10 cm away from the compressor input, and wherein the input for the gas to be cooled is formed by first ends of first gas channels, wherein second ends of the first gas channels open into the suction region, and wherein the first gas channels are distributed throughout the volume to direct gas into the suction region from multiple sides.

* * * * *